United States Patent
Sudo

(10) Patent No.: US 9,066,045 B2
(45) Date of Patent: Jun. 23, 2015

(54) DISPLAY CONTROL DEVICE, DISPLAY CONTROL METHOD AND PROGRAM

(75) Inventor: Takashi Sudo, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/996,222

(22) PCT Filed: Dec. 19, 2011

(86) PCT No.: PCT/KR2011/009791
§ 371 (c)(1),
(2), (4) Date: Jun. 20, 2013

(87) PCT Pub. No.: WO2012/086982
PCT Pub. Date: Jun. 28, 2012

(65) Prior Publication Data
US 2013/0271660 A1    Oct. 17, 2013

(30) Foreign Application Priority Data
Dec. 20, 2010  (JP) .................................. 2010-283824

(51) Int. Cl.
*H04N 5/445* (2011.01)
*H04N 21/431* (2011.01)
(Continued)

(52) U.S. Cl.
CPC ............. *H04N 5/445* (2013.01); *H04N 21/431* (2013.01); *H04N 21/4586* (2013.01); *H04N 21/6433* (2013.01); *H04N 21/8543* (2013.01)

(58) Field of Classification Search
USPC ......... 348/563, 564, 565, 570, 734, 731, 725, 348/729, 720, 719, 714, 706, 636, 680, 348/693; 725/39, 40, 32, 50, 85, 98, 105, 725/109, 152, 55, 58, 62, 133, 141, 153, 725/636, 680, 693
See application file for complete search history.

(56) References Cited

U.S. PATENT DOCUMENTS 7,653,018 B2     1/2010   Regan et al.
7,836,476 B2 *  11/2010   Yoshikawa et al. ........... 725/105
(Continued)

FOREIGN PATENT DOCUMENTS

JP     2002-344400 A    11/2002
JP     2005-192007 A     7/2005
(Continued)

OTHER PUBLICATIONS

International Search Report (PCT/ISA/210) dated Jul. 12, 2012, issued in International Application No. PCT/KR2011/009791.
(Continued)

*Primary Examiner* — Jefferey Harold
*Assistant Examiner* — Mustafizur Rahman
(74) *Attorney, Agent, or Firm* — Sughrue Mion, PLLC

(57) ABSTRACT

A display control apparatus and display control method are provided. The display control apparatus includes an acquisition unit which is configured to acquire content data, a registration unit which is configured to register at least a part of the content data, a comparison unit which is configured to compare the content data acquired by the acquisition unit and the content data registered by the registration unit and to detect an updated portion of the content data, and a display unit which is configured to display the updated portion of the content data detected by the comparison unit on a display screen.

11 Claims, 11 Drawing Sheets

(51) Int. Cl.
*H04N 21/458* (2011.01)
*H04N 21/6433* (2011.01)
*H04N 21/8543* (2011.01)

(56) References Cited

U.S. PATENT DOCUMENTS

| | | |
|---|---|---|
| 8,074,249 B2 * | 12/2011 | Shikata et al. ............. 725/110 |
| 8,140,059 B2 | 3/2012 | Okuda et al. |
| 8,170,393 B2 | 5/2012 | Nishi |
| 8,443,386 B2 * | 5/2013 | Hiroi et al. .................. 725/40 |
| 2002/0199209 A1 | 12/2002 | Shiga |
| 2006/0023730 A1 | 2/2006 | Regan et al. |
| 2008/0022334 A1 * | 1/2008 | Ushimaru et al. ............ 725/98 |
| 2008/0037050 A1 * | 2/2008 | Sasaki ..................... 358/1.13 |
| 2008/0046955 A1 | 2/2008 | Seo |
| 2008/0092198 A1 * | 4/2008 | Hutten ....................... 725/133 |
| 2008/0098432 A1 | 4/2008 | Hardacker et al. |
| 2009/0074385 A1 | 3/2009 | Nishi |
| 2009/0102859 A1 | 4/2009 | Athsani et al. |
| 2009/0300679 A1 * | 12/2009 | Hiroi et al. .................. 725/40 |
| 2011/0138416 A1 * | 6/2011 | Kang et al. .................. 725/39 |

FOREIGN PATENT DOCUMENTS

| | | |
|---|---|---|
| JP | 2005277855 A | 10/2005 |
| JP | 2008178065 A | 7/2008 |
| JP | 2008306316 A | 12/2008 |
| JP | 2009296418 A | 12/2009 |
| KR | 10-2006-0053955 A | 5/2006 |
| KR | 10-2007-0030054 A | 3/2007 |
| KR | 10-0834960 B1 | 5/2008 |
| KR | 1020100001064 A | 1/2010 |
| WO | 2006/077791 A1 | 7/2006 |

OTHER PUBLICATIONS

Written Opinion (PCT/ISA/237) dated Jul. 12, 2012, issued in International Application No. PCT/KR2011/009791.

Communication dated Sep. 1, 2014, issued by the European Patent Office in counterpart European Application No. 11851091.6.

Communication dated Sep. 9, 2014, issued by the Japanese Intellectual Property Office in counterpart Japanese Application No. 2010-283824.

* cited by examiner

DISPLAY CONTROL DEVICE, DISPLAY CONTROL METHOD AND PROGRAM

CROSS-REFERENCE TO RELATED APPLICATION

This application is a National Stage of International Application No. PCT/KR2011/009791, filed on Dec. 19, 2011, and claims priority from Japanese Patent Application No. 2010-283824, filed on Dec. 20, 2010, the disclosures of which are incorporated herein in their entirety by reference.

BACKGROUND

1. Field

Exemplary embodiments relate to a display control apparatus, a display control method, and a program.

2. Description of the Related Art

In digital broadcasting, television broadcasting that broadcasts television programs and data broadcasting that includes a combination of representation media such as text, image, sound, etc. are transmitted. The data broadcasting is may include a data file written in a broadcasting markup language (BML) form. Content such as weather information, news, traffic information, stock, sports news, breaking news, etc. may be transmitted in a current data broadcast. As the content is updated at a transmitting side, the most recent weather information or results of sport games may be provided in real time.

When the content transmitted as data broadcasting is displayed on a display screen of a television receiver, an image of a television program is contracted or is not displayed and thus viewing of the television program is hindered. However, if a display screen of data broadcasting is not displayed, a viewer may not check an update of the content.

Japanese Patent Publication No. 2006-077791 discloses a digital broadcasting recording/reproduction apparatus in which an initial part at a reproduction start position is found based on an update event of data broadcasting that is recorded.

However, in the apparatus of Japanese Patent Publication No. 2006-077791, a viewer is not able to learn in real time while watching a program whether data broadcasting is updated. Although real-time update notification is made in the second document, in order for a viewer to check update content of a data broadcast, the viewer needs to request f a display screen of the data broadcasting until updated information is displayed. In particular, when the updated information is present in a lower layer, many operational steps are needed to display the updated information, which inconveniences the viewer.

FIG. 11 is a flowchart for explaining a related art process of update notification. Referring to FIG. 11, a monitoring target is selected and registered in operation S502, a broadcasting program is displayed in operation S504, and registered data and updated data broadcasting are compared using an event message as a trigger in operation S506. After an update notification without the updated portion is displayed in operation S508, much time is spent performing a startup operation for data broadcasting in operation S510, displaying data broadcasting in operation S512, or performing an operation until an updated portion is displayed and display data including the updated portion is displayed in operations S514 and S516.

Japanese Patent Publication No. 2005-192007 discloses that, when a file such as a BML file of data set to be a monitoring target is transmitted, a viewer is notified of an update of a data broadcast. However, the structural analysis of BML has a problem in that, while update notification is made only when a content of text information is updated, the update notification is not made when an image is updated.

SUMMARY

Exemplary embodiments provide a display control apparatus, a display control method, and a program, which indicate an updated portion.

According to an aspect of an exemplary embodiment, there is provided a display control apparatus including an acquisition unit which is configured to acquire content data, a registration unit which is configured to register at least a part of or a whole of the content data, a comparison unit which is configured to compare the content data acquired by the acquisition unit and the content data registered by the registration unit and to detect an updated portion of the content data, and a display unit which is configured to display the updated portion of the content data detected by the comparison unit on a display screen.

The display unit may further display detailed data related to the updated portion when the updated portion displayed on the display screen is selected by an operator.

The comparison unit may compare a display screen generated by the display unit from the data registered by the registration unit and a display screen generated by the display unit from the acquired content data.

The acquisition unit may acquire a program broadcasting signal and a data broadcasting signal from a received broadcasting signal as the content data. The display unit may generate a display screen of a broadcasting program from the program broadcasting signal and generate a display screen of data broadcasting from the data broadcasting signal. The registration unit may register an object selected by an operator from the display screen of data broadcasting as a part or the whole data of the content data.

The comparison unit may compare a data broadcasting signal acquired from a first broadcasting signal and the data registered by the registration unit to detect the updated portion. The display unit may display the detected updated portion on a display screen generated based on a second broadcasting signal.

According to an aspect of another exemplary embodiment, there is provided a display control method including acquiring content data, registering at least a part of or the whole of the content data, comparing the content data acquired in the acquiring of the content data and the data registered in the registering of the content data, and detecting an updated portion of the content data, and displaying the updated portion detected in the detecting of the updated portion on a display screen.

According to an aspect of another exemplary embodiment, there is provided a non-transitory computer readable medium including a program for operating a computer as a device, wherein the device includes an acquisition unit which is configured to acquire content data, a registration unit which is configured to register a part of or the whole of the content data, a comparison unit which is configured to compare the content data acquired by the acquisition unit and data registered by the registration unit and detect an updated portion, and a display unit which is configured to display an updated portion detected by the comparison unit on a display screen.

According to an aspect of another exemplary embodiment, there is provided a display control method including: receiving content and data corresponding to the content in a broadcast signal; comparing the received data with data registered in the display; detecting an updated portion of the received data based on a result of the comparing; and displaying the updated portion on a display screen.

The method may also include displaying detailed data corresponding to the updated portion if the updated portion is selected by an operator.

The comparing may include comparing a display screen generated from the data registered in the display and a display screen generated from the received data.

BRIEF DESCRIPTION OF THE DRAWINGS

The above and/or other aspects will become more apparent by describing in detail exemplary embodiments thereof with reference to the attached drawings in which.

DETAILED DESCRIPTION

Figure 1:
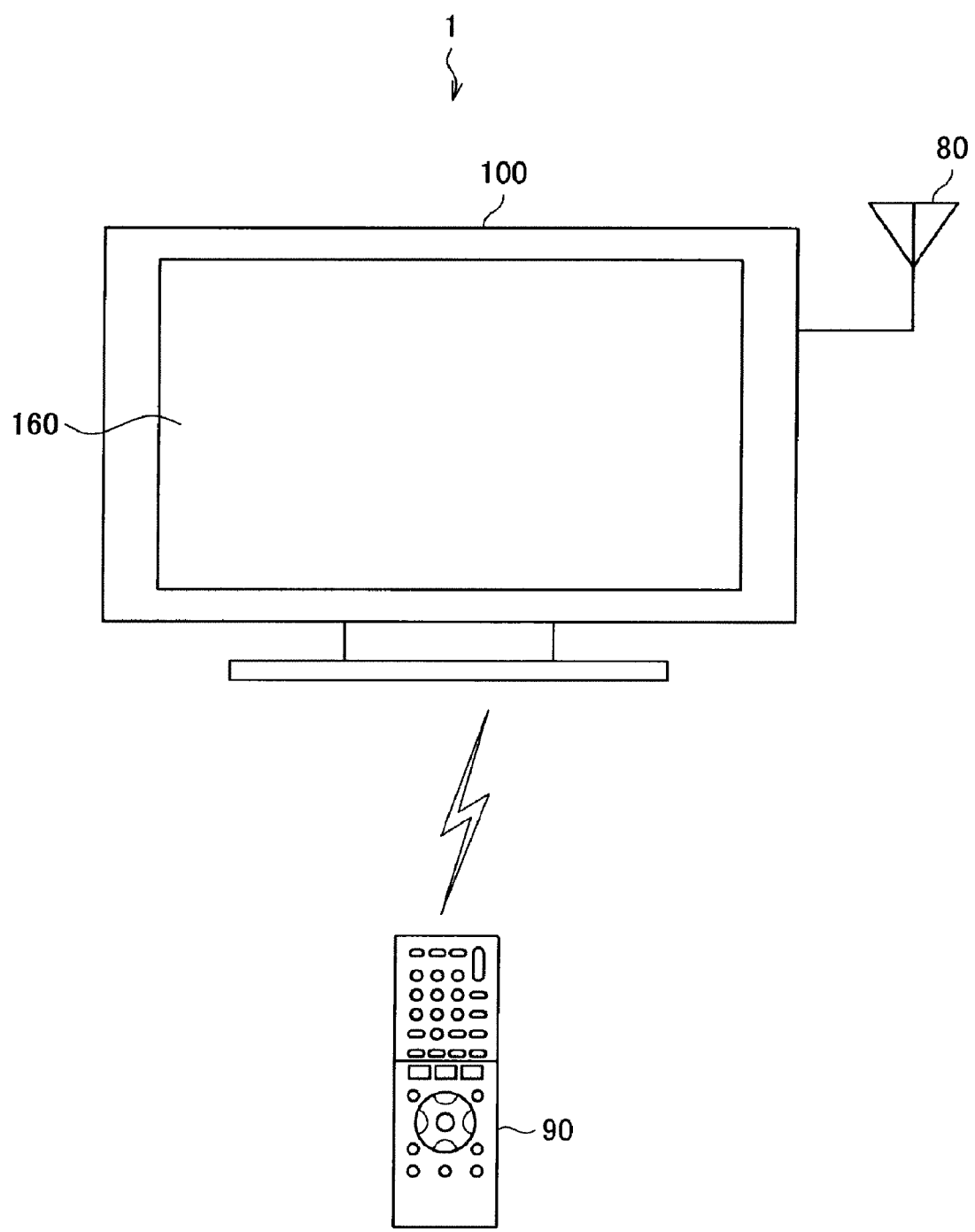
FIG. 1 is a schematic diagram for describing a summary of a display control system according to an exemplary embodiment.

The attached drawings are provided to in order to gain a sufficient understanding of the exemplary embodiments, the merits thereof, and the objectives accomplished by the implementation of the inventive concept. Hereinafter, the exemplary embodiments will be described in detail by referring to the attached drawings. Like reference numerals in the drawings denote like elements.

FIG. 1 is a schematic diagram for describing a summary of a display control system according to an exemplary embodiment. Referring to FIG. 1, the display control system 1 includes a broadcasting signal receiving apparatus 100, an operation input device 90, and a receiving antenna 80. The display control system according to the exemplary embodiment is a system which is configured to receive broadcasting signals of digital television broadcasting and display a content included in the broadcasting signals.

The receiving antenna 80 receives a broadcasting signal of digital television broadcasting and provides a received broadcasting signal to the broadcasting signal receiving apparatus 100. For example, the receiving antenna 80 may be an ultra-high frequency (UHF) antenna that receives a broadcasting signal of ground-based digital television broadcasting, or a broadcasting satellite (BS) digital antenna or a communication satellite (CS) digital antenna that receives digital satellite broadcasting. The broadcasting signal includes a data broadcasting signal that includes a combination of representation media such as text, image, sound, etc., in addition to television broadcasting (program broadcasting) that broadcasts television programs.

The operation input device 90 transmits an operation signal to the broadcasting signal receiving apparatus 100 according to a user operation. The user operation includes an operation to indicate a movement direction. For example, the operation input device 90 may be a remote controller that includes one or more buttons that may be button pressed by a user to operate the broadcasting signal receiving apparatus 100, a transmission circuit for transmitting an operation signal using an infrared ray according to the pressing of the button, and a light emission device. The buttons may include, for example, directional buttons (up/down/left/right keys and/or other types of buttons) for indicating a movement direction of a focus box 170 (see FIG. 3) on an object displayed on the broadcasting signal receiving apparatus 100. Instead of the operation input device 90, a structure in which the broadcasting signal receiving apparatus 100 replaces the operation input device 90 with another input device may be provided. For example, the broadcasting signal receiving apparatus 100 may include an operation unit such as a button. Furthermore, the broadcasting signal receiving apparatus 100 may include a sensing device such as a microphone for capturing sound and a camera for capturing an image, and a recognition unit for recognizing predetermined sound and gesture from a captured sound and/or image to generate a command.

The broadcasting signal receiving apparatus 100 is configured to display on a display unit 160 content included in a broadcasting signal provided by the receiving antenna 80. The broadcasting signal receiving apparatus 100 is operated by a user through an operation signal it receives from the operation input device 90. For example, the broadcasting signal receiving apparatus 100 may be a television receiver set corresponding to digital television broadcasting.

In detail, the broadcasting signal receiving apparatus 100 displays on the display unit 160 a program image being broadcasted based on the program broadcasting signal included in the broadcasting signal. The broadcasting signal receiving apparatus 100 displays on the display unit 160 information transmitted based on the data broadcasting signal included in the broadcasting signal. When the information transmitted as the data broadcasting is displayed on the display unit 160, the program image may be contracted or may not be displayed.

Although a television system that receives digital television broadcasting is described as a display control system, the exemplary embodiments are not limited thereto. For example, a content source is not limited to a broadcasting signal of digital television broadcasting. For example, the display control system 1 may include a network connection device such as a router instead of the receiving antenna 80, whereas the broadcasting signal receiving apparatus 100 may receive a content from a network via a corresponding network connection device. Additionally, the display control system 1 may include a content providing apparatus (not shown) that stores content, instead of the receiving antenna 80, and the broadcasting signal receiving apparatus 100 may receive the content from the corresponding content providing apparatus.

Although the broadcasting signal receiving apparatus 100 is used as an example of the display control apparatus in the present exemplary embodiment, the display control apparatus is not limited thereto. For example, the display control apparatus may be a user device having a display unit, such as a mobile phone, a mobile game device, a music player, etc., or an image reproduction apparatus such as a Blu-ray® disc (BD) player, a digital versatile disc (DVD) player, etc.

Figure 2:
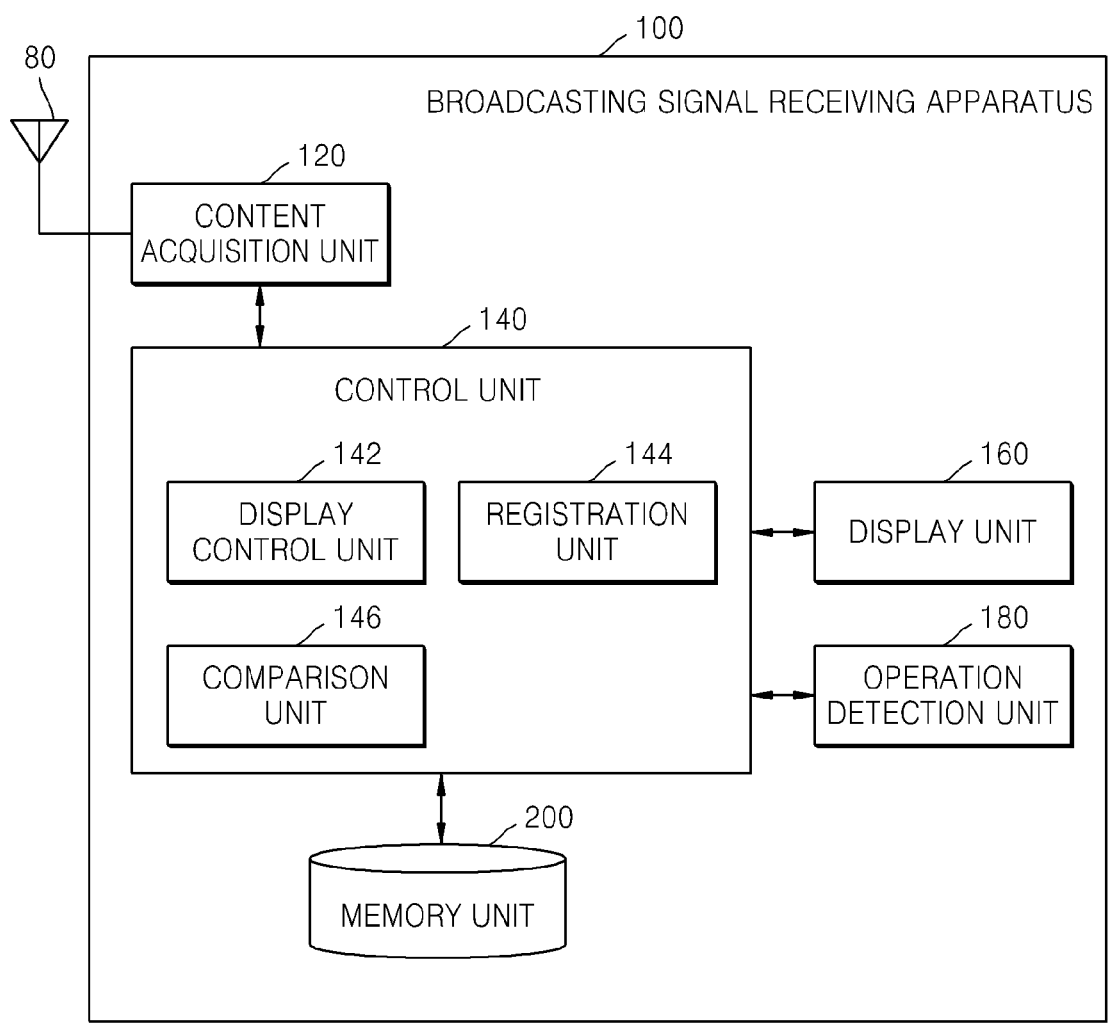
FIG. 2 is a block diagram illustrating a broadcasting signal receiving apparatus according to an exemplary embodiment.

An example of a detailed structure of the broadcasting signal receiving apparatus 100 of the display control system 1 is described below with reference to FIG. 2. FIG. 2 is a block diagram illustrating an example of a structure of the display control system 100 according to an exemplary embodiment. Referring to FIG. 2, the broadcasting signal receiving apparatus 100 may include a content acquisition unit 120, a control unit 140, a display unit 160, an operation detection unit 180 (e.g., an input device), and a memory unit 200.

The content acquisition unit 120 acquires content data from a broadcasting signal. For example, the content acquisition unit 120 demodulates the broadcasting signal provided from the receiving antenna 80 and decodes transport stream (TS) packets obtained from the demodulation and thus acquires image, sound, and additional data as content data. The content acquisition unit 120 outputs the corresponding content data to the control unit 140. The additional data may include data for defining the structure and arrangement of objects such as characters, diagrams, still images, etc. and data for the operation of each object. The additional data may be, for example, data provided in a broadcast markup language (BML) format.

As described above, program broadcasting and data broadcasting are transmitted in the digital broadcasting. The data broadcasting includes a file such as text or diagram written in the BML and an image file or a sound file. A group of the files is continuously transmitted while being appropriately updated by a Carousel transmission method. The content acquisition unit 120 acquires information being sent as data broadcasting as content data, as described above. The content data is referred to as BML content.

The control unit 140 controls the broadcasting signal receiving apparatus 100 in addition to storing the BML content output from the content acquisition unit 120 in the memory unit 200. The control unit 140 includes a display control unit 142, a registration unit 144, and a comparison unit 146.

Figure 3:
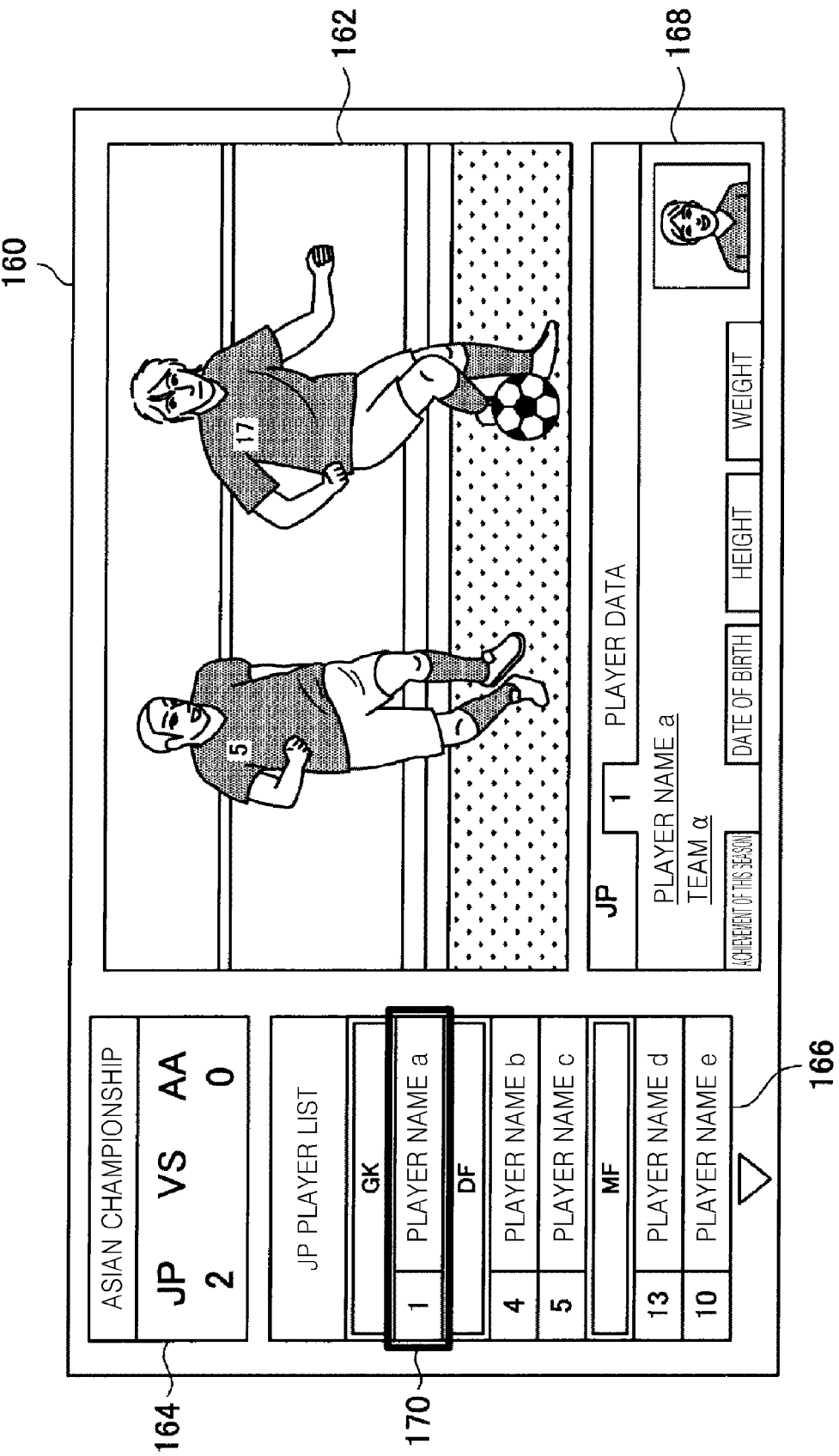
FIG. 3 is a view schematically illustrating an example of data broadcasting according to an exemplary embodiment.

The display control unit 142 generates a display image from content data output from the content acquisition unit 120 and outputs the generated display image to the display unit 160. The display image output to and displayed on the display unit 160 may include a plurality of objects 164, 166, and 168 that display an image 162 of a broadcasting program and information of the BML content as illustrated in FIG. 3. In detail, FIG. 3 illustrates a result of a match as an object 164, a list of team members as an object 166, and player data as the object 168.

The display control unit 142 controls the content by the display unit 160 and the display of a user interface according to a user operation detected by the operation detection unit 180. For example, when the operation detection unit 180 detects an operation to start a display screen of data broadcasting, the display control unit 142 generates a display image of the BML content and outputs the generated display image to the display unit 160. When the operation detection unit 180 detects an operation to call detailed data related to the displayed data of the BML content, the display control unit 142 generates a display image of the detailed data and outputs the generated display image to the display unit 160. For example, when a player is selected by using the focus box 170 from a player list of the object 166 as illustrated in FIG. 3, player data is displayed in the object 168 as detailed data related to a selected player.

The registration unit 144 registers a part or the whole of data of the BML content as monitoring target data in the memory unit 200 according to a user operation detected by the operation detection unit 180. The registration of the monitoring target data is described later with reference to FIGS. 4 and 5.

Next, when the content data output from the content acquisition unit 120 is an update notification of data broadcasting, the comparison unit 146 compares the content data acquired by the content acquisition unit 120 with the data registered in the memory unit 200 by the registration unit 144 and detects an updated portion. The detection of an updated portion is described later with reference to FIGS. 6 and 7. The update notification of data broadcasting may be an event message transmitted as digital storage media command and control (DSM-CC).

The operation detection unit 180 receives an operation signal from the operation input device 90 and detects an operation by a user. In an exemplary embodiment, a user operation includes an operation to indicate at least data to be registered as a monitoring target. When the user operation to indicate data to be registered is detected, the operation detection unit 180 generates information indicating data to be registered and outputs the generated information to the control unit 140. When another operation is detected, the display unit 160 generates information corresponding to the operation and outputs the generated information to the control unit 140.

The memory unit 200 stores the BML content and the data to be registered as a monitoring target by the registration unit 144. The registered data may be, for example, a "div" element and a "p" element defined in a BML document. Since information to be noted, e.g., a text string indicating a match result or scores, may be included in binary data referred to in the BML document, if there is a data file that is referred to by an element, the data file may be registered as a monitoring target. Data other than the text string, such as an image or table of the BML content, may be stored as registered data.

The display unit 160 displays the display image generated by the display control unit 142. In detail, the display image generated by the display control unit 142 is converted into an image signal by a conversion unit (not shown) and the display unit 160 displays the display image according to the image signal.

Although the structure of the broadcasting signal receiving apparatus 100 is described above, the broadcasting signal receiving apparatus 100 may be embodied by a combination of hardware and software. The content acquisition unit 120 may be embodied by, for example, a tuner, a demodulator, and a TS decoder. The operation detection unit 180 may be embodied by, for example, an IC circuit and a photodiode which convert an infrared ray into an electrical signal. The control unit 140 and the memory unit 200 may be embodied by a CPU, a RAM, and a ROM. For example, a CPU may control the overall operation of the broadcasting signal receiving apparatus 100, a ROM may store a program and data to control the operation of the broadcasting signal receiving apparatus 100, and a RAM may temporarily store a program and data during execution of a process by the CPU. The conversion unit may be embodied by a video card. The display unit 160 may be embodied by a display such as an LCD display, a plasma display, an organic EL display, an FED, etc.

Figure 4:
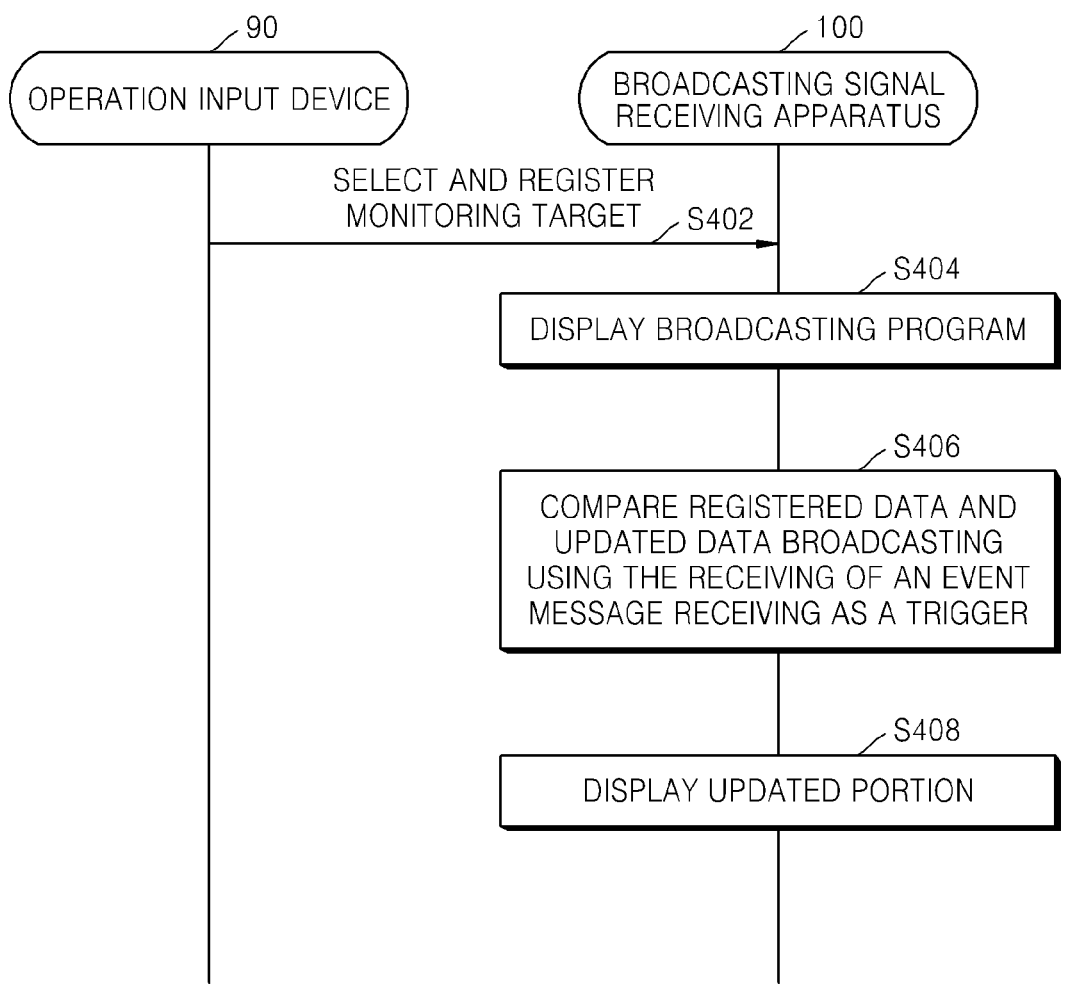
FIG. 4 is a flowchart for showing a method of a display control system according to an exemplary embodiment.

A display control method according to an exemplary embodiment is described below with reference to FIG. 4. FIG. 4 is a flowchart for explaining an example of a display control method of the broadcasting signal receiving apparatus 100 according to an exemplary embodiment. The example of method shows a case in which an updated portion of the BML content is displayed.

Referring to FIG. 4, in operation 5402, data of the BML content that is a monitoring target is selected and an operation to indicating registration is performed, by a user using the operation input device 90. For example, a content having information that varies according to the passage of time, e.g., soccer or baseball, is registered. Accordingly, when information is changed, for example, a score is made, a player is replaced, or an actual message is updated, an updated portion may be checked. For a data broadcasting linked program, information is frequently changed together with the passage of time. Whether it is a data broadcasting linked program may be confirmed by referring to "data" of an electronic program guide (EPG).

Figure 5:
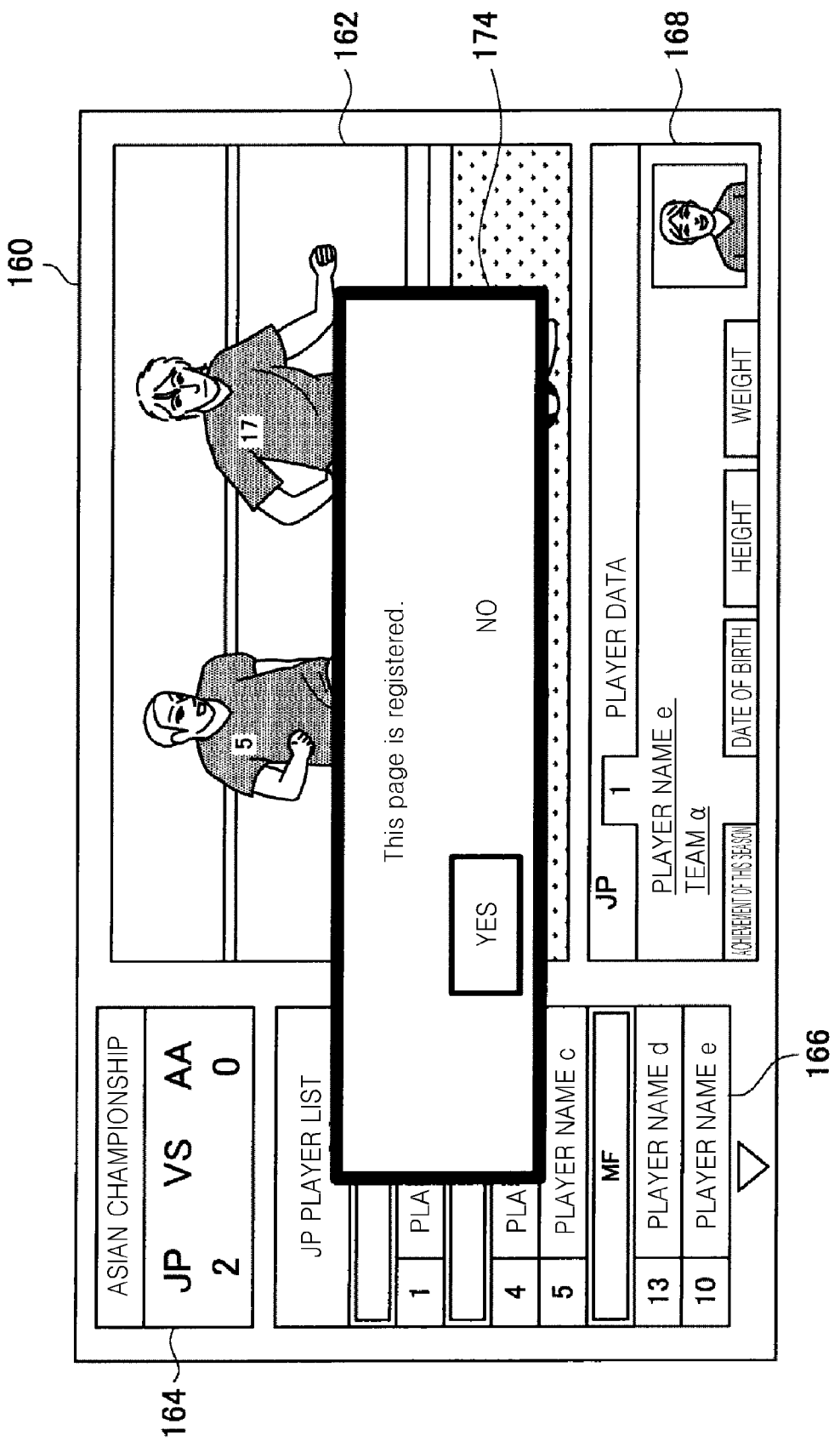
FIG. 5 is a view for explaining an operation of registering a monitoring target according to an exemplary embodiment.
Figure 6:
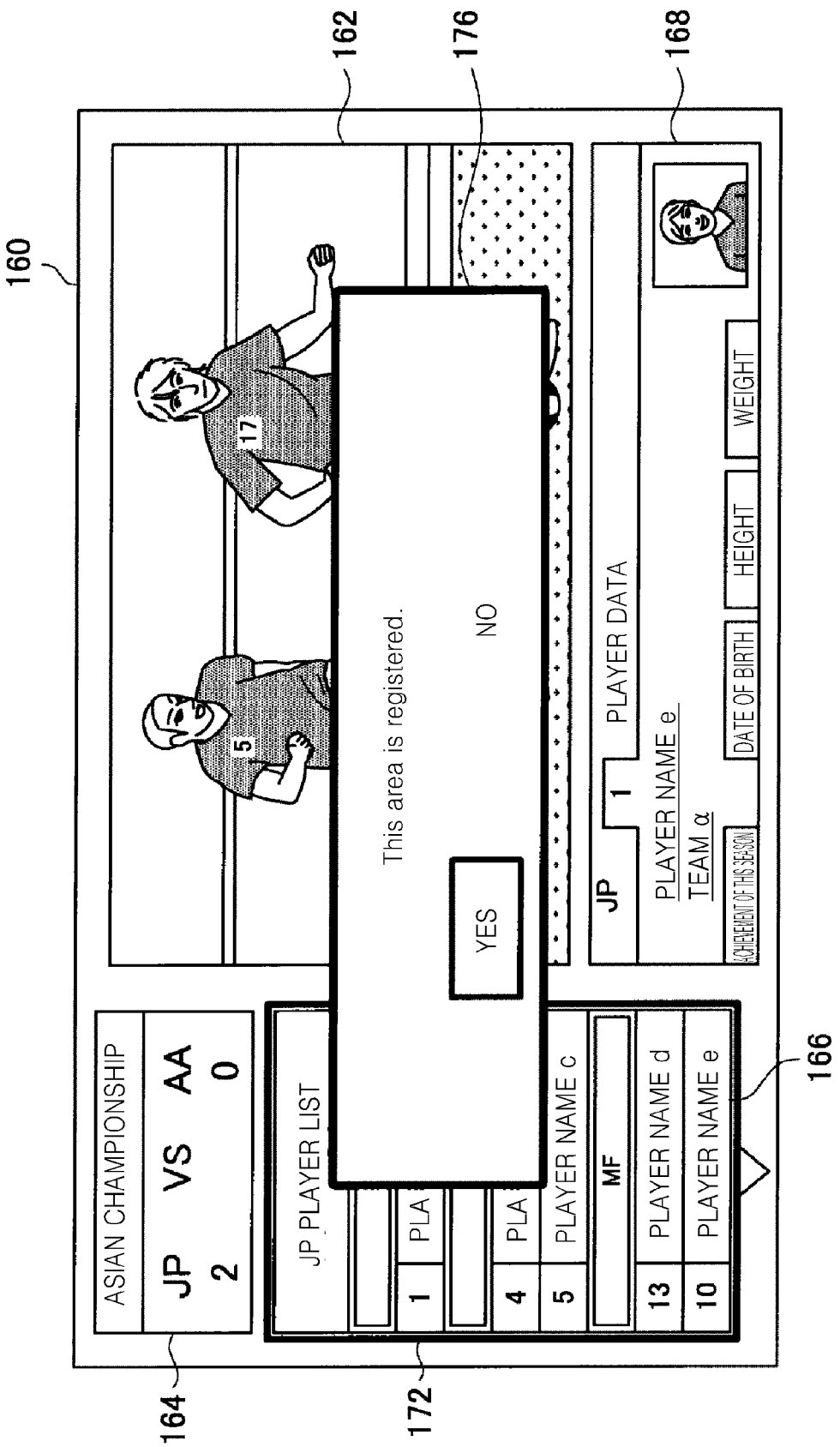
FIG. 6 is a view for explaining an operation of registering a monitoring target according to an exemplary embodiment.

For example, a case is described below, in which data that is a monitoring target is selected through the operation input device 90 when a display screen of the BML content is displayed on the display unit 160 with respect to the registration operation. First, when all of the BML content that is being displayed is to be registered, an operation to select all pages is performed through the operation input device 90. Then, as illustrated in FIG. 5, as a message 174 of "This page is registered. YES/NO" is displayed on the display unit 160, "YES" is selected through the operation input device 90 so that all of the BML content is registered as a monitoring target. Second, when a part of the BML content that is being displayed is to be registered, an operation to select a BML content to be registered from a focus box 172 is performed through the operation input device 90. Then, as illustrated in FIG. 6, as a message 176 of "This area is registered. YES/NO" is displayed on the display unit 160, "YES" is selected through the operation input device 90 so that a part of the BML content is registered as a monitoring target.

Next, in operation 5404, the BML content is not displayed by an operation through the operation input device 90 and a broadcasting program is displayed on the entire screen of the display unit 160.

Next, in operation 5406, the broadcasting signal receiving apparatus 100 compares the data registered as a monitoring target and the newly acquired data of the BML content of the data broadcasting using the receiving of an event message as a trigger, and detects an updated portion.

Figure 7:
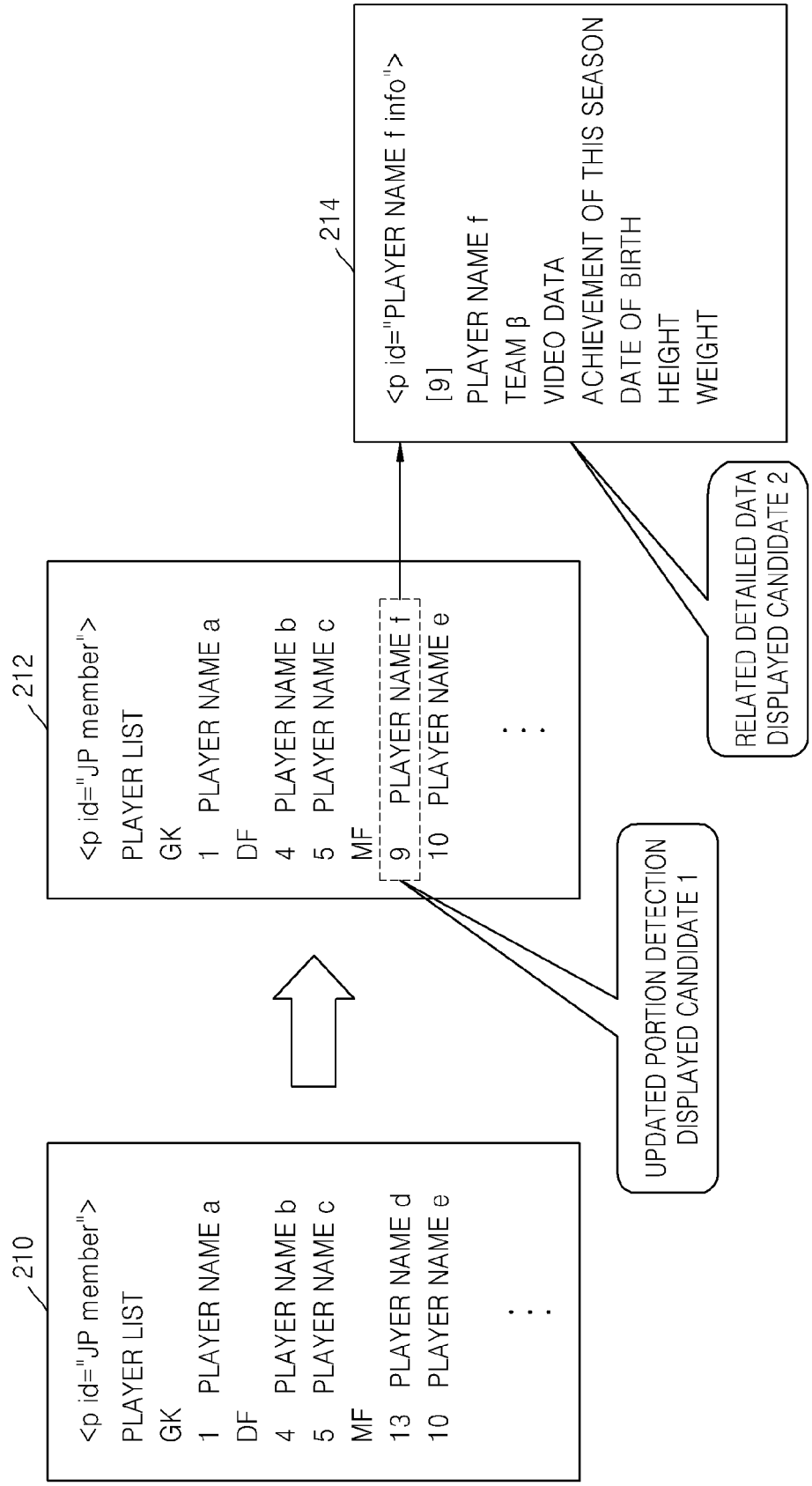
FIG. 7 is a view for explaining detection of an updated portion according to an exemplary embodiment.

For example, as illustrated in FIG. 7, an updated portion is detected by comparison of text strings of a BML document. In FIG. 7, when a registered 'p' element 210 is updated to a 'p' element 212, text strings are compared and thus a "9 Player Name f" is detected as an updated portion. When the updated portion is a displayed candidate 1 and there is detailed data related to the updated portion of the displayed candidate 1, the detailed data of the updated portion may be a displayed candidate 2. In FIG. 7, a 'p' element 214 indicating player information that is detailed data related to the "9 Player Name f" is the displayed candidate 2.

Figure 8:
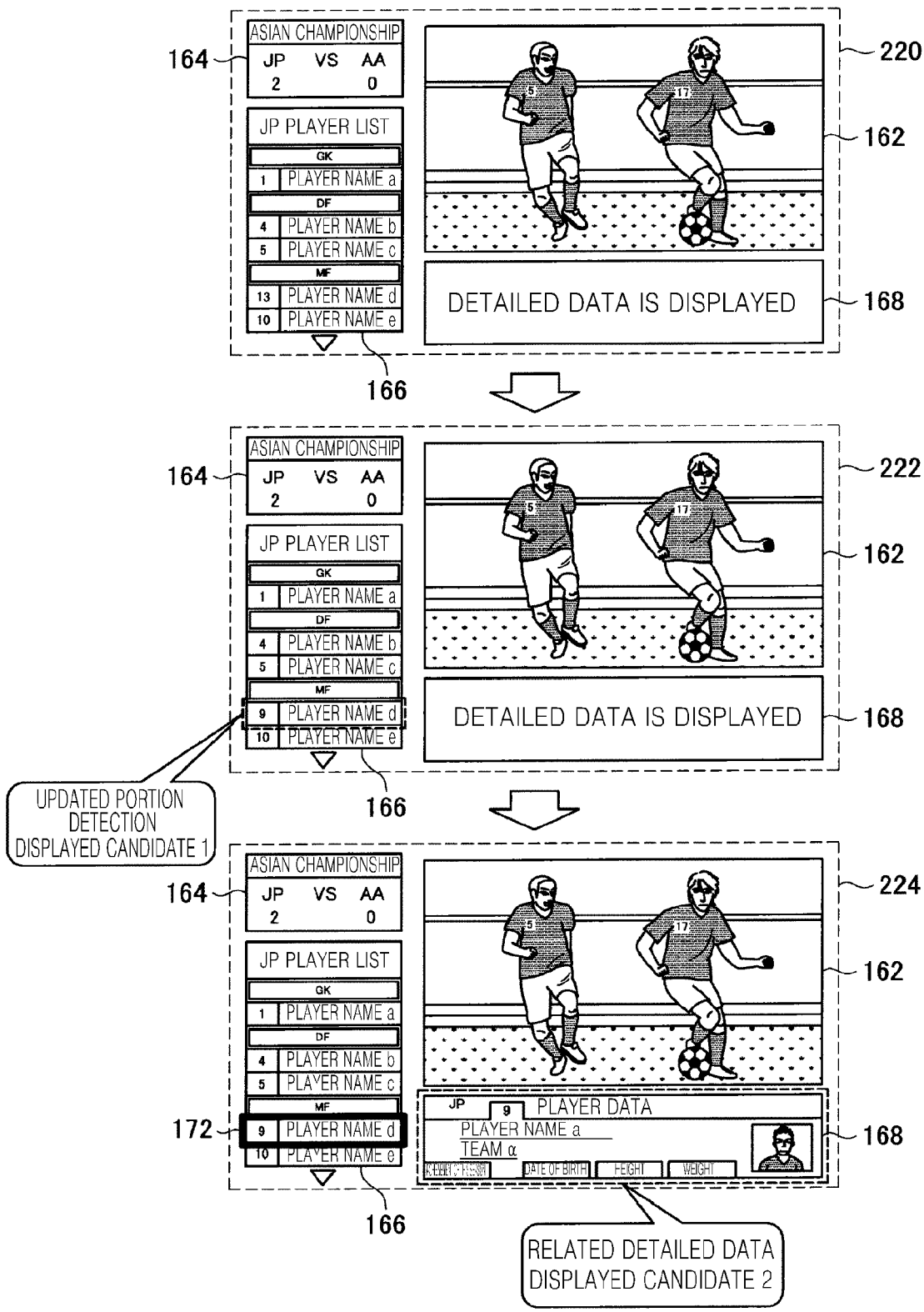
FIG. 8 is a view for explaining detection of an updated portion according to an exemplary embodiment.

As illustrated in FIG. 8, an updated portion may be detected by comparison of, for example, images other than text strings. In this case, a registered image 220 is updated to an image 222, the registered image 220 is compared with the image 222 that is generated by the display control unit 142 from the newly acquired BML content and thus the "9 Player Name f" is detected as an updated portion. Since the comparison of images is possible, an update may be detected even when the text "9 Player Name f" is expressed as image data. When the updated portion is a displayed candidate 1 and there is detailed data related to an updated portion of the displayed candidate 1, the detailed data of the updated portion may be a display candidate 2. In FIG. 8, when the focus box 172 is moved to the "9 Player Name f", the image object 168 that is displayed is the displayed candidate 2.

Figure 9:
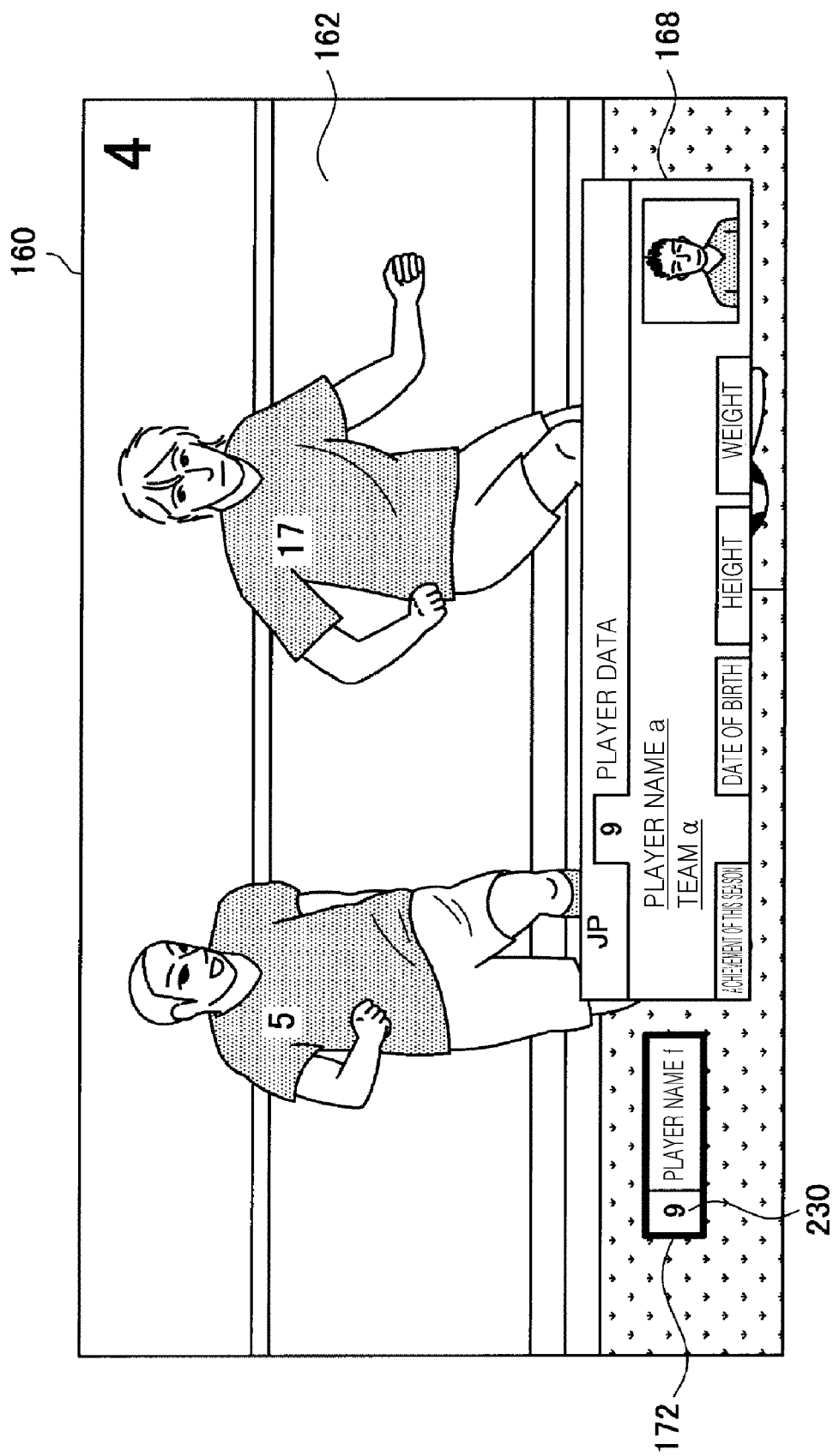
FIG. 9 is a view schematically illustrating an example of displaying an updated portion according to an exemplary embodiment.

Next, in operation S408, the updated portion is displayed on the display unit 160. For example, as illustrated in FIG. 9, when the image 162 of a broadcasting program is displayed on the entire screen of the display unit 160, an updated portion 230 (displayed candidate 1) is displayed. In this state, the detailed data object 168 that is the displayed candidate 2 may be simultaneously displayed. Alternatively, the displayed candidate 1 is first displayed and then, when the updated portion 230 is selected by the focus box 172, the related detailed data object 168 (displayed candidate 2) may be displayed.

Figure 10:
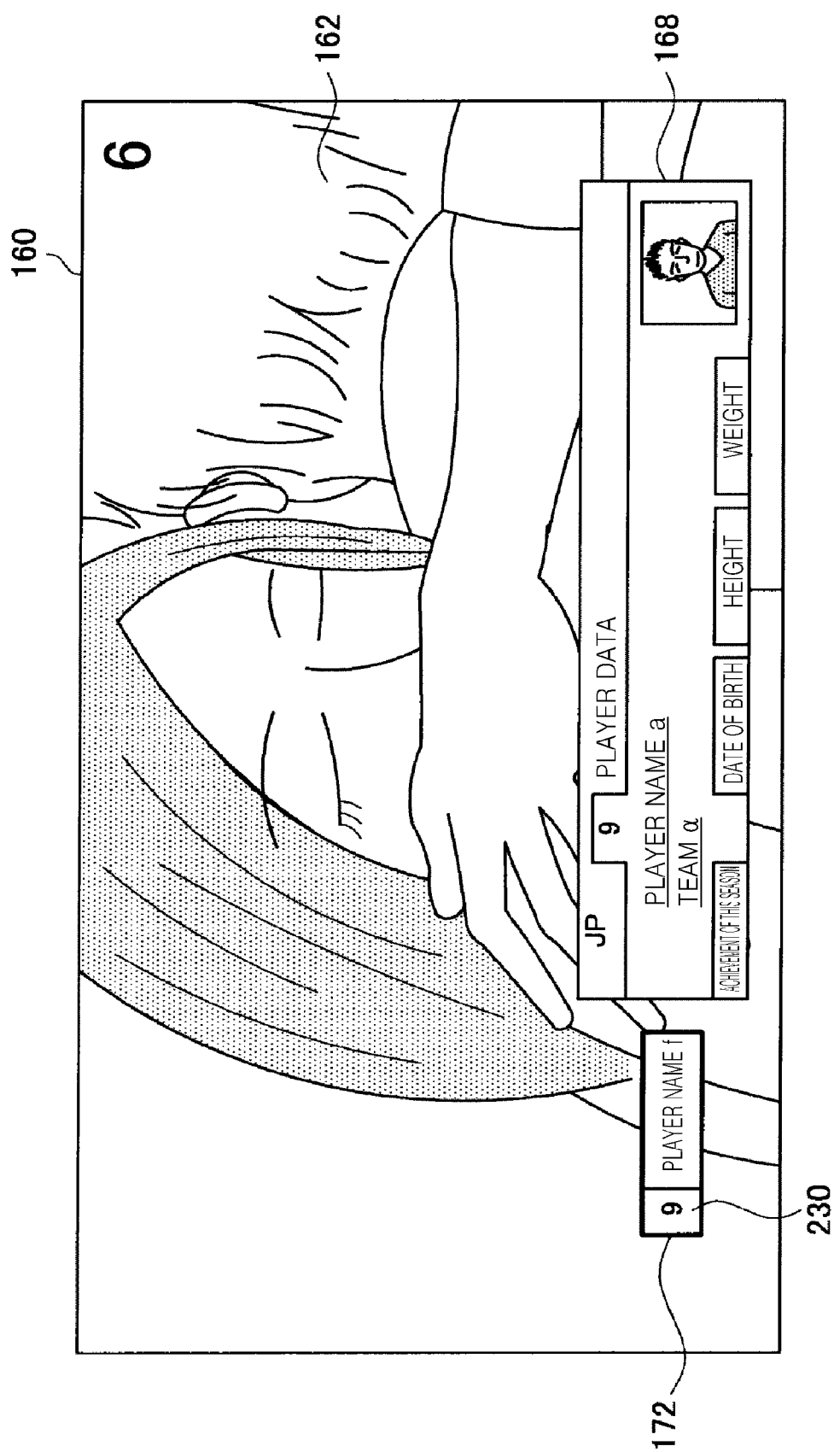
FIG. 10 is a view schematically illustrating an example of displaying an updated portion according to an exemplary embodiment.

While a broadcasting program of a channel different from the registered data is being displayed, the updated portion may be displayed. For example, as illustrated in FIG. 10, when the image 162 of a broadcasting program of another channel that is different from the registered data is being displayed on the entire screen of the display unit 160, the updated portion 230 (displayed candidate 1) is displayed. In this state, the detailed data object 168 that is the displayed candidate 2 may be simultaneously displayed. Alternatively, the displayed candidate 1 is first displayed and then, when the updated portion 230 is selected by the focus 172, the related detailed data object 168 (displayed candidate 2) may be displayed.

A method of displaying an updated portion displayed on a display screen is not limited to the examples of FIGS. 9 and 10. For example, the updated portion may be transmissively displayed on the image 162 of a broadcasting program. Accordingly, an updated content may be suggested without disturbing a viewer watching a program. When the updated portion is determined to be difficult to recognize, a visibly enhancing effect such as outline improvement may be added.

After the broadcasting program ends, the registered data may be deleted or may be stored when it is a program whose next broadcasting schedule (drama broadcasted every week or a special program regularly broadcasted during a match period) may be checked by referring to the EPG.

As described above, in the broadcasting signal receiving apparatus 100 according to an exemplary embodiment, even when a display screen of data broadcasting is not displayed, if a previously registered BML content is changed by data broadcasting update, the updated portion is automatically displayed and thus the update portion may be recognized without any special operation by a user.

Figure 11:
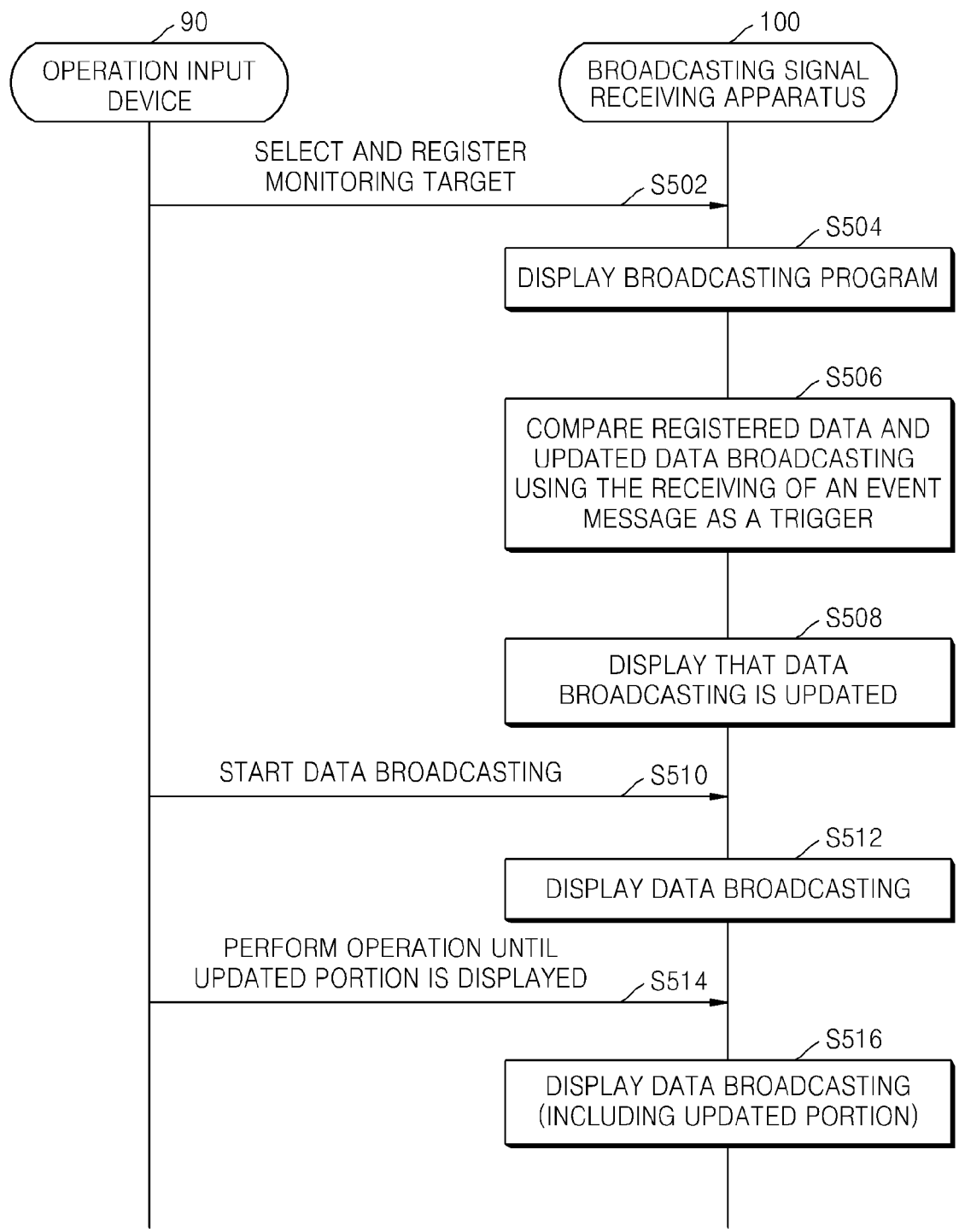
FIG. 11 is a flowchart for explaining a conventional process of update notification.

In detail, as illustrated in FIG. 11, the updated portion may be displayed without the operation time in the operations S510 and S514 (see operation S408 of FIG. 4).

As described above, in the display control apparatus, the program, and the display control method according to an exemplary embodiment, the burden of a user regarding the movement of a focus box in a user interface may be reduced.

A computer program may be written to enable hardware included in the broadcasting signal receiving apparatus 100 to have the same function as each component of the broadcasting signal receiving apparatus 100. A storage medium storing the computer program may be provided.

Exemplary embodiments may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

Exemplary embodiments relate to a display control apparatus, a program, and a display control method and may be applied to television receivers, personal computers, mobile phones, etc.

While exemplary embodiments have been particularly shown and described, it will be understood by those skilled in the art that various changes in form and details may be made therein without departing from the spirit and scope of the inventive concept as defined by the appended claims.

What is claimed is:

1. A display control apparatus comprising:
an acquisition unit which is configured to acquire content data;
a registration unit which is configured to register at least a part of the content data;
a comparison unit which is configured to compare the content data acquired by the acquisition unit and the at least the part of the content data registered by the registration unit and to detect an updated portion of the content data; and
a display unit which is configured to display the updated portion of the content data detected by the comparison unit distinctly from the registered at least a part of the content data on a display screen, and to further display the detailed data related to the updated portion of the content data when the updated portion is selected by a user.

2. The display control apparatus of claim 1, wherein the comparison unit is further configured to compare a display screen generated by the display unit from the content data registered by the registration unit and a display screen generated by the display unit from the content data acquired by the acquisition unit.

3. The display control apparatus of claim 1, wherein the acquisition unit is further configured to acquire a program broadcasting signal and a data broadcasting signal from a received broadcasting signal as the content data,
wherein the display unit is further configured to generate a display screen of a broadcasting program from the program broadcasting signal and generate a display screen of data broadcasting from the data broadcasting signal, and
wherein the registration unit is further configured to register an object selected by an operator from the display screen of data broadcasting as at least the part of the content data.

4. The display control apparatus of claim 3, wherein the comparison unit is further configured to compare a data broadcasting signal acquired from a first broadcasting signal and the content data registered by the registration unit to detect the updated portion of the content data, and
wherein the display unit is further configured to display the detected updated portion of the content data on a display screen generated based on a second broadcasting signal.

5. A display control method comprising:
acquiring content data;
registering at least a part of the content data;
comparing the content data that is acquired and the at least the part of the content data that is registered to detect an updated portion of the content data; and
displaying the updated portion of the content data detected in the detecting of the updated portion distinctly from the registered at least a part of the content data on a display screen, and further displaying the detailed data related to the updated portion of the content data when the updated portion is selected by a user.

6. The display control method of claim 5, wherein the detecting the updated portion of the content data comprises comparing a display screen generated from the content data that is registered and a display screen generated from the content data that is acquired.

7. The display control method of claim 5, wherein the acquiring the content data comprises acquiring a program broadcasting signal and a data broadcasting signal from a received broadcasting signal,
wherein a display screen of a broadcasting program is generated from the program broadcasting signal and a display screen of data broadcasting is generated from the data broadcasting signal, and
wherein the registering the content data comprises registering an object selected by an operator from the display screen of data broadcasting as at least the part of the content data.

8. The display control method of claim 5, wherein the detecting of the updated portion comprises comparing a data broadcasting signal acquired from a first broadcasting signal and the content data that is registered with each other to detect the updated portion of the content data, and
wherein the displaying the updated portion of the content data comprises displaying the detected updated portion of the content data on a display screen generated based on a second broadcasting signal.

9. A non-transitory computer readable medium comprising computer executable instructions for performing the method of claim 5.

10. A display control method comprising:
receiving content and data corresponding to the content in a broadcast signal;
comparing the received data with data and registered in the display;
detecting an updated portion of the received data based on a result of the comparing; and
displaying the updated portion distinctly from the registered a part on a display screen, and further displaying the detailed data related to the updated portion of the content data when the updated portion is selected by a user.

11. The display control method of claim 10, wherein the comparing comprises comparing a display screen generated from the data registered in the display and a display screen generated from the received data.

* * * * *